United States Patent
Yang et al.

(10) Patent No.: US 7,572,540 B2
(45) Date of Patent: Aug. 11, 2009

(54) STRUCTURE FOR IMPROVING LAMINATING EFFICIENCY OF METAL-SEPARATOR FOR FUEL CELL

(75) Inventors: Yoo Chang Yang, Gyeonggi-do (KR); Young Bum Kum, Seoul (KR); Sae Hoon Kim, Gyeonggi-do (KR); Min Kyu Song, Seoul (KR); Hwan Soo Shin, Gyeonggi-do (KR); Jong Hyun Lee, Gyeongsangbuk-do (KR); Sang Mun Chin, Gyeongsangbuk-do (KR); Kyu Taek Cho, Gyeongsangbuk-do (KR)

(73) Assignee: Hyundai Motor Company, Seoul (KR)

( * ) Notice: Subject to any disclaimer, the term of this patent is extended or adjusted under 35 U.S.C. 154(b) by 419 days.

(21) Appl. No.: 11/635,362

(22) Filed: Dec. 6, 2006

(65) Prior Publication Data
US 2008/0063919 A1    Mar. 13, 2008

(30) Foreign Application Priority Data
Sep. 7, 2006    (KR) ............... 10-2006-0086441

(51) Int. Cl.
*H01M 2/14*    (2006.01)
*H01M 2/08*    (2006.01)

(52) U.S. Cl. .......................... 429/38; 429/35
(58) Field of Classification Search ............... 429/38, 429/35
See application file for complete search history.

(56) References Cited

FOREIGN PATENT DOCUMENTS

| JP | 2002-100381 | 4/2002 |
|----|-------------|--------|
| JP | 2002-305006 | 10/2002 |
| JP | 2002-367665 | 12/2002 |
| JP | 2004-127711 | 4/2004 |
| JP | 2004-241208 | 8/2004 |
| KR | 10-2004-0011601 | 2/2004 |
| WO | WO-00/01025 | 1/2000 |

*Primary Examiner*—Patrick Ryan
*Assistant Examiner*—Thomas H. Parsons
(74) *Attorney, Agent, or Firm*—Edwards Angell Palmer & Dodge LLP; Peter F. Corless

(57) ABSTRACT

Disclosed is a structure for improving a laminating efficiency of a metal-separator for a fuel cell stack, the metal-separator comprising an embossed structure that has an indentation and a projection alternately formed along at least one edge thereof so as to enable a plurality of the metal-separators to be stably laminated in a honeycomb shape.

8 Claims, 5 Drawing Sheets

【FIG. 1】 (Prior Art)
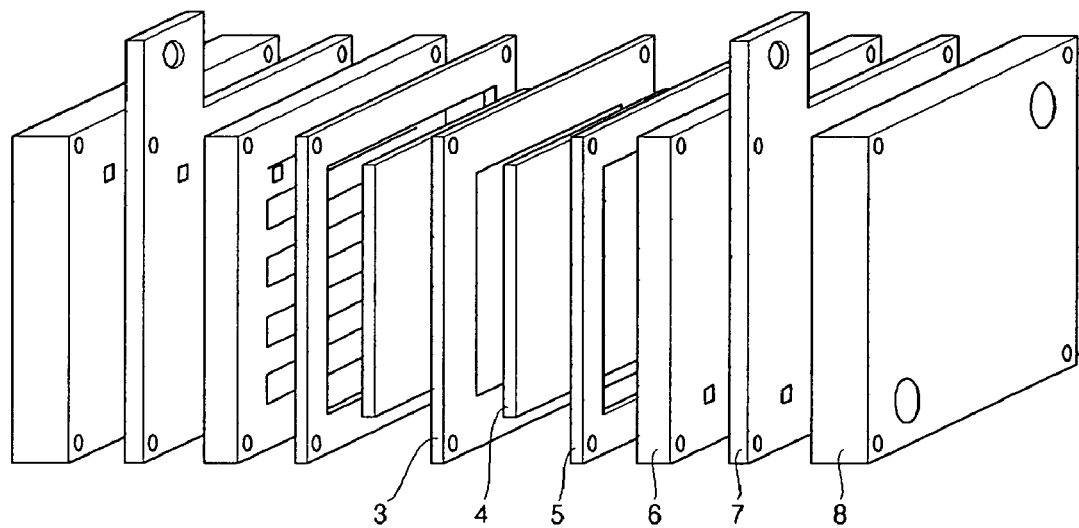
【FIG. 2A】 (Prior Art)
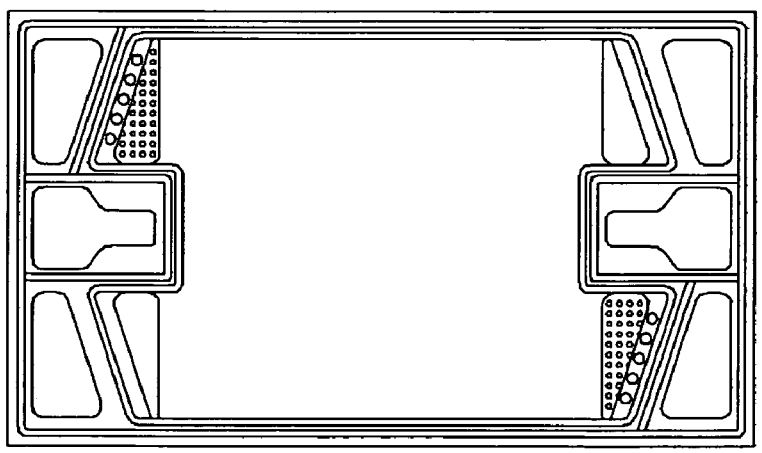

[FIG. 2B] (Prior Art)
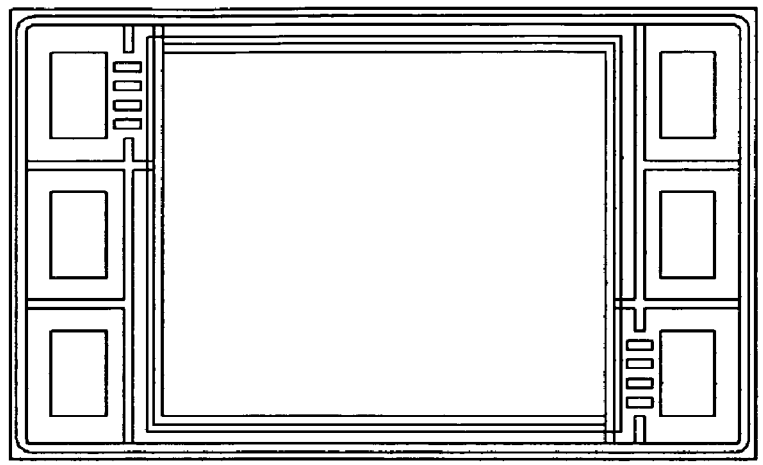
[FIG. 3A]
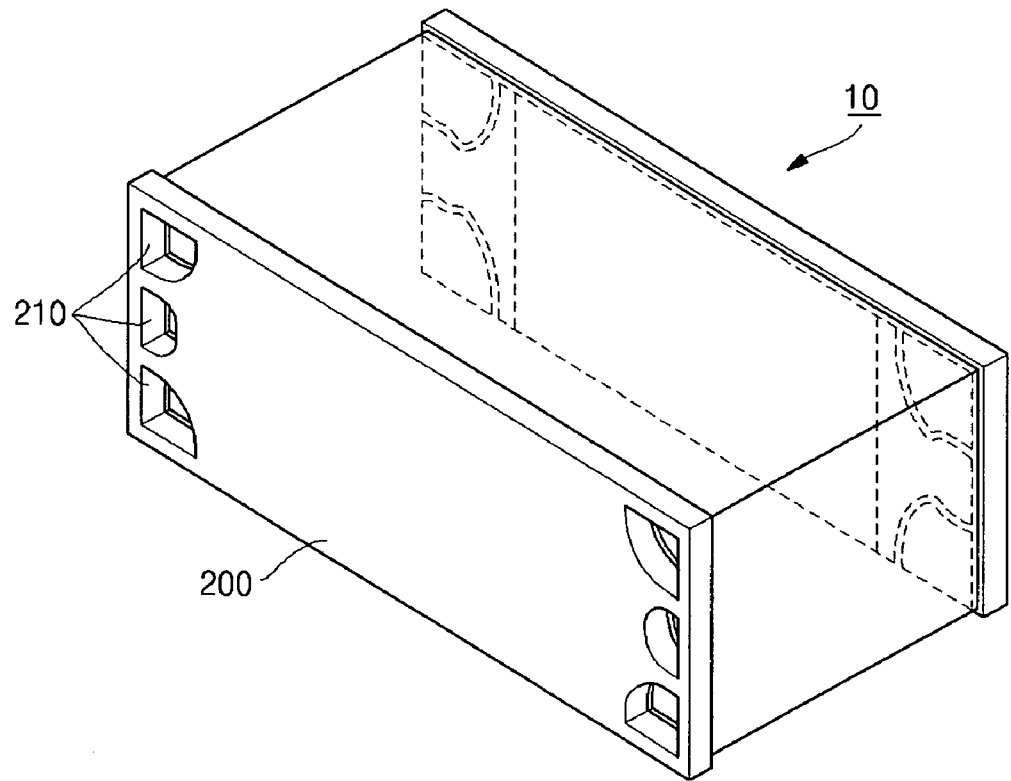

[FIG. 3B]
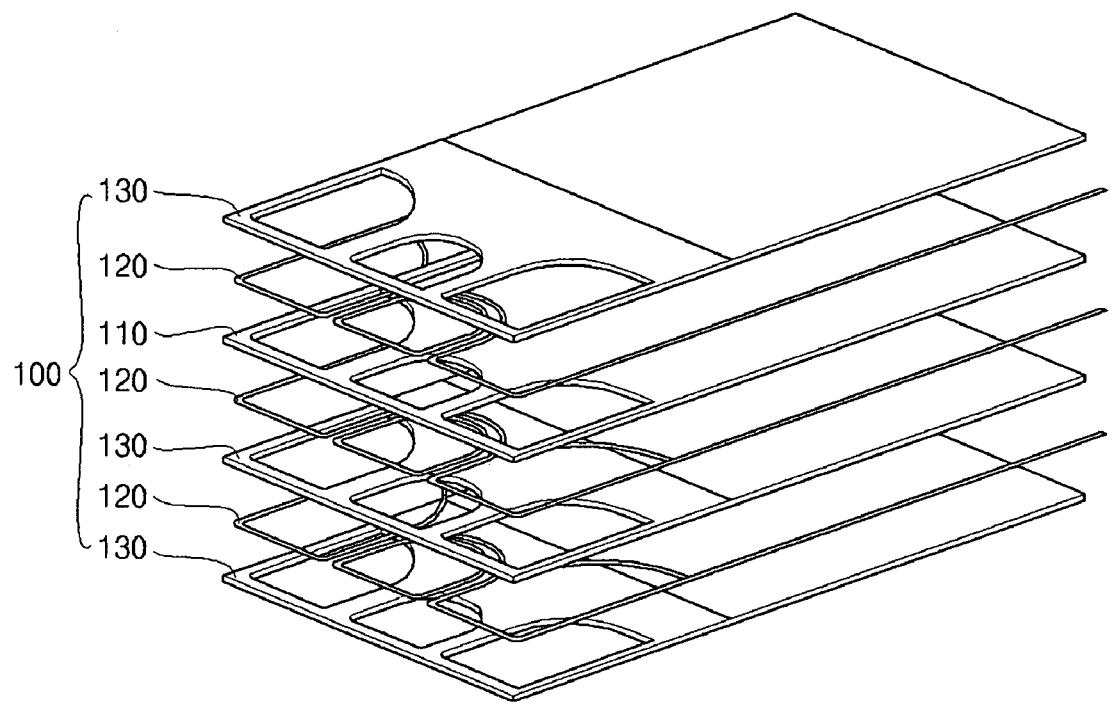
[FIG. 4]
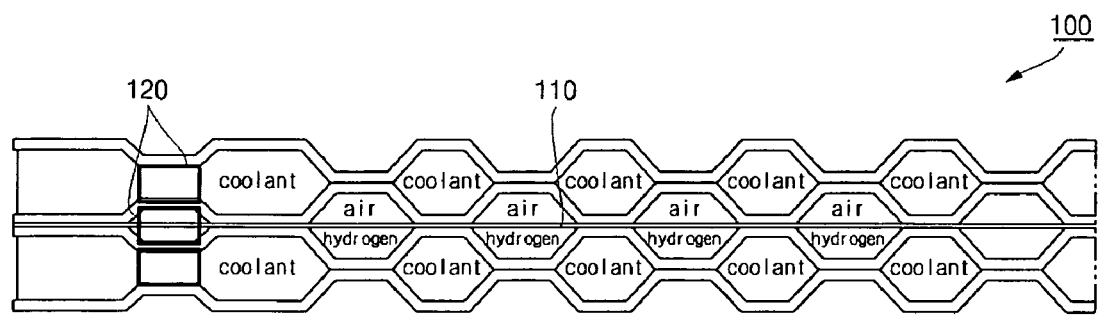

[FIG. 5A]
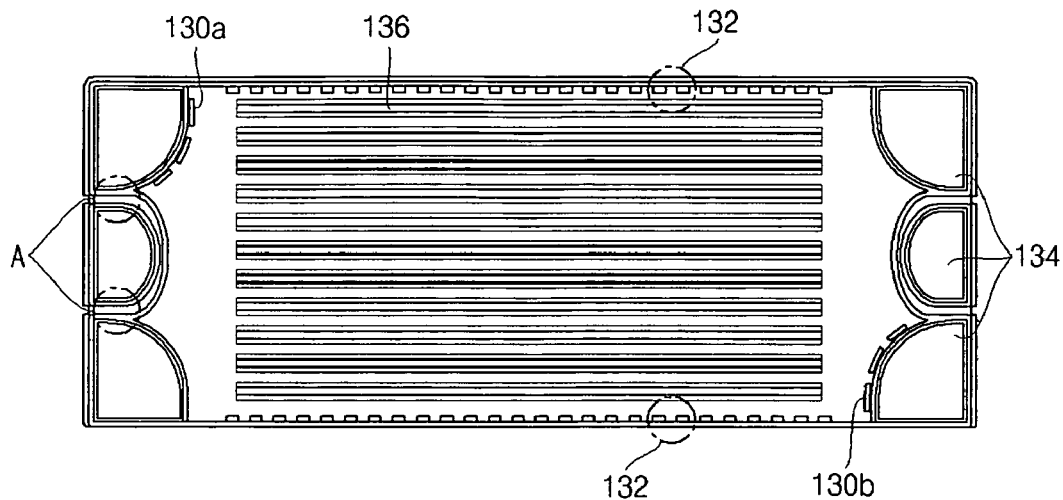
[FIG. 5B]
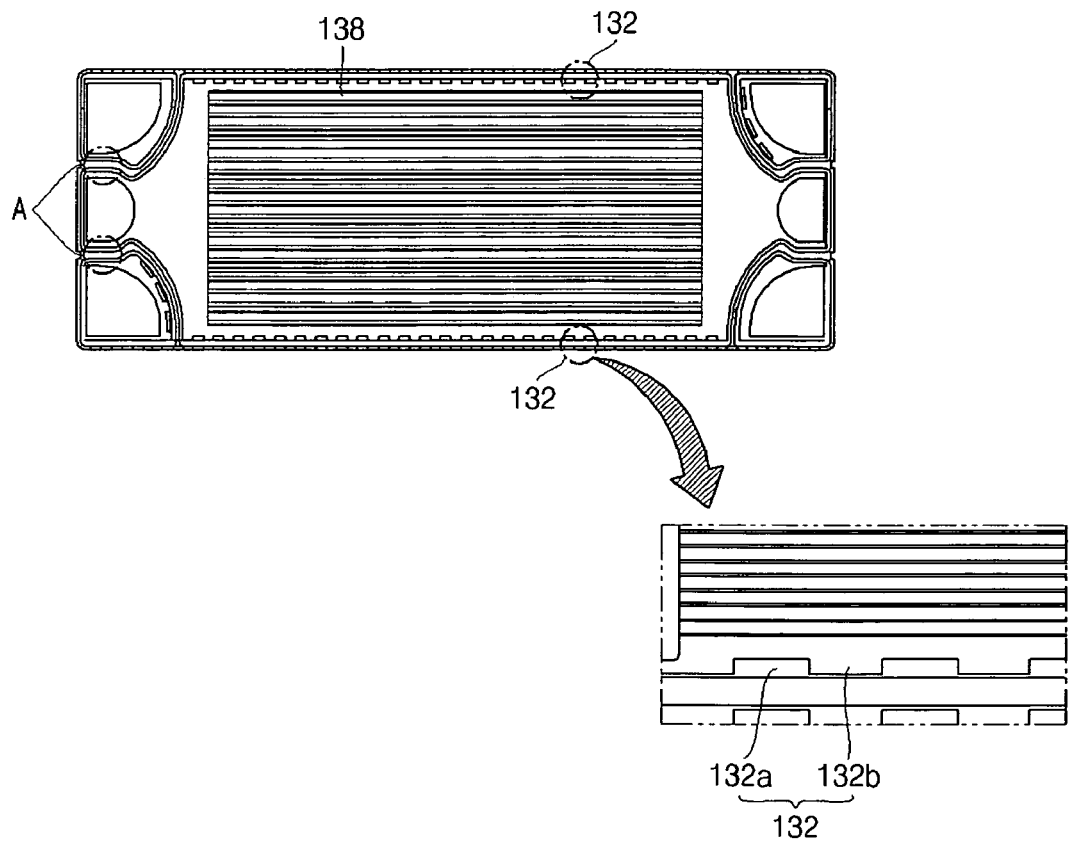

[FIG. 6]
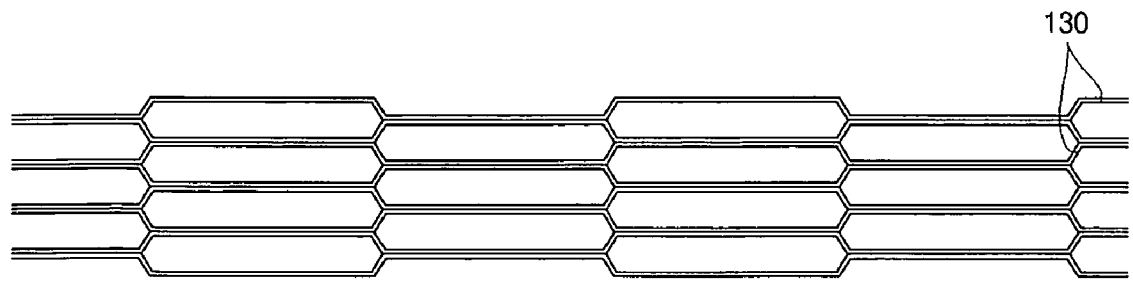

STRUCTURE FOR IMPROVING LAMINATING EFFICIENCY OF METAL-SEPARATOR FOR FUEL CELL

CROSS-REFERENCE TO RELATED APPLICATION

This application claims priority to and the benefit of Korean Patent Application No. 10-2006-0086441 filed in the Korean Intellectual Property Office on Sep. 7, 2006, the entire contents of which are incorporated herein by reference.

BACKGROUND OF THE INVENTION (a) Field of the Invention

The present invention relates to a metal-separator for a fuel cell stack, and more particularly to a structure for improving laminating efficiency of a metal-separator for a fuel cell stack in which an edge of the separator comprises an embossed structure so that a plurality of the separators can be stably laminated in a honeycomb structure.

(b) Background

FIG. 1 is an exploded perspective view of a conventional polymer electrolyte fuel cell, and FIG. 2A and FIG. 2B are top plan views thereof.

As shown in FIG. 1, a polymer electrolyte fuel cell stack 1 includes a membrane electrode assembly (MEA) 3 which is comprised of a polymer electrolyte membrane and electrodes formed on both sides of the polymer electrolyte membrane. It also includes a pair of gas diffusion layers 4 which are coupled to the membrane electrode assembly 3 and deliver reaction gases to the electrodes. It also includes a pair of conductive separators 6 which adhere to outer surfaces of the respective gas diffusion layers 4 so as to supply reaction gases. It also includes a gasket 5 which is interposed between the membrane electrode assembly 3 and the separator 6 so as to prevent the reaction gases from being leaked and to seal a gap. In addition, current collectors 7 and connecting plates (end plates) 8 are coupled to the outside of the separator 6, thereby forming the fuel cell stack 1.

The separator 6 separates hydrogen and oxygen, electrically connects the membrane electrode assembly 3, and supports the membrane electrode assembly 3 to maintain the shape of the fuel cell stack 1.

Accordingly, the separator should have a rigid structure for preventing the two gases from being mixed, an excellent electrical conductivity for serving an electrical conductor, and a high strength for serving a support member.

However, since voltage generated by one unit cell (basic unit of a fuel cell which is formed by coupling the membrane electrode assembly, the gasket, and the separator) is small, tens or hundreds of unit cells should be laminated in order to produce a desired electric power.

In the case that a lot of unit cells are laminated, if the separator cannot maintain a constant surface pressure, the separator may be locally deformed so that the sealing cannot be maintained. There have been many structures suggested to overcome this problem. Such structures, however, have a complicated sealing structure, causing the forming process to be complicated and limiting the degree of freedom in the development of design.

There is thus a need for an improved structure that can overcome the problems.

SUMMARY OF THE INVENTION

In one aspect, the present invention provides a structure for improving laminating efficiency of a metal-separator for a fuel cell stack in which at least one edge of the separator comprises an embossed structure so that a plurality of the separators can be stably laminated in a honeycomb structure.

In a preferred embodiment, the present invention provides a structure for improving a laminating efficiency of a metal-separator for a fuel cell stack which includes: a unit cell having a membrane electrode assembly; a gas diffusion layer moving reaction gases to the membrane electrode assembly; a metal-separator coupled to an outside of the gas diffusion layer so as to support the membrane electrode assembly; a gasket interposed between the membrane electrode assembly and the metal-separator so as to prevent reaction gas from being leaked; and a connecting plate having a plurality of manifolds and coupled to an outside of the unit cell so as to support the unit cell, wherein the metal-separator comprises an embossed structure that has a plurality of indentations and a plurality of projections alternatively formed at least one edge thereof so as to enable a plurality of the metal-separators to be stably laminated in a honeycomb shape.

Preferably, the metal-separator may comprise at one or more longitudinal end thereof a plurality of separator manifolds corresponding to the manifolds of the connecting plate.

The metal-separator may further include a reaction surface on its front surface and a cooling surface on its rear surface.

The reaction surface, preferably, is coupled to the gas diffusion layer so as to allow the reaction gas to be supplied and to be discharged.

The metal-separator may further include a reaction gas inlet hole in the vicinity of the separator manifolds provided at one end portion of the separator, and a reaction gas out let hole in the vicinity of the separator manifolds provided at the end portion opposite to the reaction gas inlet hole.

In a preferred embodiment, the gasket may be disposed along the edge of the metal-separator having the embossed structure and along the surrounding of the separator manifold so as to seal the area between the membrane electrode assembly and the metal-separator.

Preferably, the gasket may have a shape that fits the corresponding shape of the separator manifold.

Also preferably, a separate embossed structure may be further provided to the space between the respective separator manifolds for contributing to precisely determine the installation position of the gasket.

In another aspect, motor vehicles are provided that comprise a described structure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like. The present structures will be particularly useful with a wide variety of motor vehicles.

Other aspects of the invention are discussed infra.

BRIEF DESCRIPTION OF THE DRAWINGS

FIG. 1 is an exploded perspective view of a conventional polymer electrolyte fuel cell.

FIG. 2A and FIG. 2B are top plan views of a conventional separator.

FIG. 3A is a perspective view of a fuel cell to which a metal-separator according to an exemplary embodiment of the present invention is applied.

FIG. 3B is an exploded view showing a laminating sequence of a metal-separator of FIG. 3A.

FIG. 4 is a cross sectional view showing a laminating state of a metal-separator according to an exemplary embodiment of the present invention.

FIG. 5A is a top plan showing a reaction surface of a metal-separator according to an exemplary embodiment of the present invention.

FIG. 5B is a top plan view showing a cooling surface of a metal-separator according to an exemplary embodiment of the present invention.

FIG. 6 is a drawing showing a structure in which a plurality of metal-separators according to an exemplary embodiment of the present invention is laminated.

Reference numerals set forth in the Drawings includes reference to the following elements as further discussed below:

10: fuel cell stack 100: unit cell
110: membrane electrode assembly 120: gasket
130: metal-separator 132: embossed structure
136: reaction surface 138: cooling surface
130a: reaction gas inlet hole 130b: reaction gas outlet hole

DETAILED DESCRIPTION

An exemplary embodiment of the present invention will hereinafter be described in detail with reference to the accompanying drawings.

FIG. 3A is a perspective view of a fuel cell to which a metal-separator according to an exemplary embodiment of the present invention is applied, FIG. 3B is an exploded view showing a laminating sequence of a metal-separator of FIG. 3A, FIG. 4 is a cross sectional view showing a laminating state of a metal-separator according to an exemplary embodiment of the present invention, FIG. 5A is a top plan showing a reaction surface of a metal-separator according to an exemplary embodiment of the present invention, FIG. 5B is a top plan view showing a cooling surface of a metal-separator according to an exemplary embodiment of the present invention, and FIG. 6 is a drawing showing a structure in which a plurality of metal-separators according to an exemplary embodiment of the present invention are laminated.

As shown in FIG. 3A and FIG. 3B, a metal-separator 130 is sequentially laminated in an inside of a fuel cell stack 10.

As shown in FIG. 3B, the metal-separators 130 are respectively coupled to both sides of a membrane electrode assembly (MEA) which is comprised of a polymer electrolyte membrane and electrodes formed on both sides of the polymer electrolyte membrane, and is integrated with a gas diffusion layer (not shown) which delivers the gas to the electrode. A gasket 120 is interposed between a membrane electrode assembly 110 and the metal-separator 130 for preventing leakage of reaction gas and for sealing gaps between them. Tens or hundreds of unit cells 100 formed by coupling the membrane electrode assembly 110, the gasket 120, and the metal-separator 130 are laminated, and a current collector (not shown) and a connecting plate (end plate) 200 are coupled to the laminated unit cells 100 so as to support the same, thereby forming the fuel cell stack 10. A plurality of manifolds 210 is formed on the connecting plate 200 for supplying reaction gas and coolant to the unit cell 100.

As shown in FIG. 4, in the unit cell 100, the gasket 120 and the metal-separator 130 are sequentially disposed on both sides of the membrane electrode assembly 110, and adhere closely to the membrane electrode assembly 110. Coolant, air, and hydrogen are not mixed with one another by the flow passages formed in the metal-separator 130 and the gasket 120. They are supplied to the membrane electrode assembly 110 through the metal-separator 130 and are discharged (detailed explanation for this will be made later).

As shown in FIG. 5A and FIG. 5B, the metal-separator 130 includes an embossed structure 132 which is formed along an edge of the plate surface. It also includes a plurality of separator manifolds 134 which are formed at both ends in the length direction of the plate surface corresponding to the manifolds 210 formed in the connecting plate 200. In addition, a reaction surface 136 which is coupled to a gas diffusion layer so as to allow reaction gas to be supplied and to be discharged is formed on a front surface of the metal-separator 130, and a cooling surface 138 which is a passage of coolant for cooling the unit cell 100 is formed on a rear surface of the metal-separator 130 (since flow passages which are formed in a metal-separator and are passages of air, hydrogen, and coolant are typically used in a metal-separator, detailed explanation for the same will be omitted).

As shown in FIG. 5A, a reaction gas inlet hole 130a for supplying hydrogen gas to the unit cell 100 is formed at an inward portion from the separator manifold 134 which is formed at one end of the metal-separator 130. In addition, a reaction gas outlet hole 130b through which hydrogen gas is discharged is formed at an inward portion from the separator manifold 134 which is formed at the other end of the metal-separator 130.

The reaction gas inlet hole 130a and the reaction gas outlet hole 130b allow reaction gases to be supplied and discharged therethrough, and make it easy to design a sealing structure of the reaction surface.

As shown in FIG. 5A and FIG. 5B, the embossed structure 132 has an indentation 132a which is inwardly indented and a projection 132b which is outwardly protruded. The indentation and the projection are alternately formed along an edge of the metal-separator 130.

The metal-separator 130 may be made by forming a metal plate with a thickness of 0.1 to 0.2 mm using a stamping process (forming process in which a metal plate is mounted on a solid member and is being stamped so as to form) to produce a sealing structure having a linear shape and a curve shape. Although a metal plate may be twisted after the forming, the metal-separator 130 has a high strength against deformation since the embossed structure 132 is formed along the edge of the metal-separator 130.

In addition, since an edge of the metal-separator 130 is formed to have the embossed structure 132, a plurality of the metal-separators 130 is laminated so as to form a honeycomb structure. This structure helps the fuel cell stack 10 to be evenly laminated, and serves to increase the connecting pressure, thereby tightly and stably connecting the unit cells of the fuel cell stack 10 (referring to FIG. 4 and FIG. 6).

In addition, the embossed structure 132 serves to enable the gasket 120 to be easily coupled.

Typically, a gasket groove may be formed on both sides of a graphite separator. However, with the stamping process, it is not possible to form grooves for coupling a gasket at the same positions of both sides of the metal-separator 130 which is used for connecting the fuel cell stack 10 in an exemplary embodiment of the present invention.

A position where the gasket 120 is located can be precisely determined by the embossed structure 132 according to an exemplary embodiment of the present invention.

As shown in FIG. 5A and FIG. 5B, the gasket 120 is coupled along an edge of the metal-separator 130 and the surrounding of the separator manifold 134, so the gasket 120 seals the area between the metal-separator 130 and the membrane electrode assembly 110 when the metal-separator 130 is coupled to the membrane electrode assembly 110.

For this, the gasket 120 should be coupled at the substantially same positions on the reaction surface 136 and the cooling surface 138, and since the embossed structure 132 is formed along the edge of the metal-separator 130, the gasket 120 can be coupled to the substantially same positions on both sides of the metal-separator 130 even without a guide groove if the gasket 120 is positioned between the embossed structure 132 and the edge.

In addition, since the gasket 120 should seal the surrounding of the separator manifold 134, the gasket 120 is coupled along the surrounding of the separator manifold 134. It is preferable that the gasket 120 coupled to the reaction surface 136 is coupled to be disposed between the separator manifold 134, the reaction gas inlet hole 130a and the reaction gas outlet hole 130b, so as not to close the reaction gas inlet hole 130a and the reaction gas outlet hole 130b.

However, it is preferable that the gasket 120 coupled to the cooling surface 138 is coupled to be disposed outside the reaction gas inlet hole 130a and the reaction gas outlet hole 130b, i.e., inside the metal-separator so as prevent reaction gas from being leaked to the cooling surface 138 through the reaction gas inlet hole 130a and the reaction gas outlet hole 130b.

Although the gasket 120 can be formed in a shape corresponding to the shape of the separator manifold 134, an embossed structure may be added to the space between respective separator manifolds 134 in order to fix an installation location (referring to regions A of FIG. 5A and FIG. 5B). Accordingly, an installation position of the gasket 120 can be precisely determined even without a separate guide groove.

As described above, in a metal-separator for a fuel cell stack according to an exemplary embodiment of the present invention, an edge of a metal-separator contacting a gasket is formed in an embossed structure so that the metal-separator can be laminated in a stable honeycomb structure that can reduce the frequency of laminating error and increasing the connecting pressures, thereby enhancing laminating characteristics.

Furthermore, even when a linear shape and a curve shape are mixed in the forming of the metal-separator, edge portion(s) of the metal-separator may maintain a high strength against the deformation by the embossed structure, thereby preventing the metal-separator from being deformed and enhancing the stability of a fuel cell stack.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A structure for improving a laminating efficiency of a metal-separator for a fuel cell stack which includes: a unit cell having a membrane electrode assembly; a gas diffusion layer moving a reaction gas to the membrane electrode assembly; a metal-separator coupled to an outside of the gas diffusion layer so as to support the membrane electrode assembly; a gasket interposed between the membrane electrode assembly and the metal-separator so as to prevent the reaction gas from being leaked; and a connecting plate having a plurality of manifolds and coupled to an outside of the unit cell so as to support the unit cell, wherein the metal-separator comprises:

an embossed structure that has a plurality of indentations and a plurality of projections alternately formed along at least one edge thereof so as to enable a plurality of the metal-separators to be stably laminated in a honeycomb shape.

2. The structure of claim 1, wherein the metal-separator comprises at one or more longitudinal end thereof a plurality of separator manifolds corresponding to the manifolds of the connecting plate.

3. The structure of claim 2, wherein the metal-separator further comprises a reaction surface on its front surface and a cooling surface on its rear surface.

4. The structure of claim 3, wherein the reaction surface is coupled to the gas diffusion layer so as to allow the reaction gas to be supplied and discharged.

5. The structure of claim 4, wherein the metal-separator further comprises a reaction gas inlet hole in the vicinity of the separator manifolds provided at one end portion of the separator, and a reaction gas outlet hole in the vicinity of the separator manifolds provided at the other end portion opposite to the reaction gas inlet hole.

6. The structure of claim 2, wherein the gasket is disposed along the edge of the metal-separator having the embossed structure and along the surrounding of the separator manifold so as to seal the area between the membrane electrode assembly and the metal-separator.

7. The structure of claim 6, wherein the gasket has a shape that fits the corresponding shape of the separator manifold.

8. The structure of claim 7, wherein an embossed structure is further provided to the space between the respective separator manifolds for contributing to precisely determine the installation position of the gasket.

* * * * *